(No Model.)

A. PERKINS.
SHAFT BEARING CONE.

No. 494,885. Patented Apr. 4, 1893.

Witnesses:
Harry S. Rohrer
E. N. Berry

Inventor:
Albert Perkins
By Niles & Greene,
Attorneys

UNITED STATES PATENT OFFICE.

ALBERT PERKINS, OF CHICOPEE, MASSACHUSETTS, ASSIGNOR TO THE A. G. SPALDING & BROTHERS, OF NEW YORK, N. Y., AND THE LAMB KNITTING MACHINE MANUFACTURING COMPANY, OF CHICOPEE FALLS, MASSACHUSETTS.

SHAFT-BEARING CONE.

SPECIFICATION forming part of Letters Patent No. 494,885, dated April 4, 1893.

Application filed September 5, 1892. Serial No. 445,089. (No model.)

*To all whom it may concern:*

Be it known that I, ALBERT PERKINS, a citizen of the United States, residing at Chicopee, in the county of Hampden and State of Massachusetts, have invented certain new and useful Improvements in Shaft-Bearing Cones; and I do hereby declare the following to be a full, clear, and exact description of the invention, such as will enable others skilled in the art to which it appertains to make and use the same.

The objects of this invention are to produce a better and less expensive bearing cone and to more perfectly exclude dust from the ball bearings of cycles.

Figure 1:
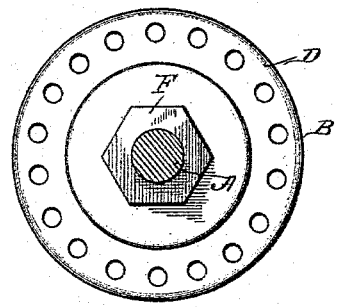
Figure 2:
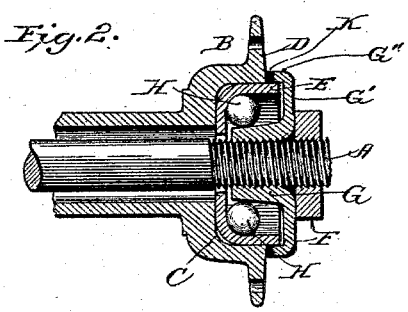
Figure 3:
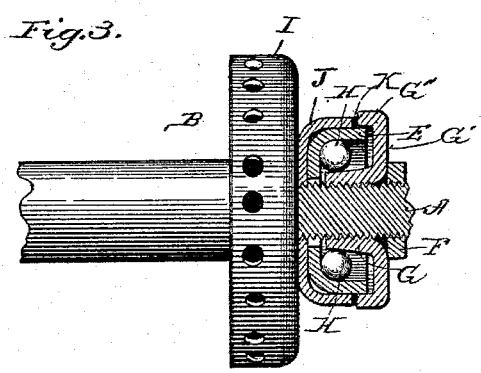

In the drawings,—Figure 1 is an end view of a wheel hub and such coacting parts as are particularly involved in this invention. Fig. 2 is an axial section of the same devices. Fig. 3 shows the novelty of Figs. 1 and 2, in connection with a hub claimed by me in another application Serial No. 445,087 of even date herewith.

One end only of the hub is shown and described.

In Figs. 1 and 2, A is a non-revoluble cycle axle, threaded at the end, and B is a hub thereon provided with spoke flanges D and an end recess C in which is brazed a ball case E that projects beyond the surrounding portion of the hub, of which it in effect forms a part. Bearing balls are placed in the case where they are retained by an internally threaded cone G, G', G'' screwed upon the axle. The cone is of sheet steel and is formed from a disk by subjecting the latter to the action of a series of dies that gradually draw out from it a central conical tube G and a marginal annular flange G''. The tube is then internally threaded. The parts are so proportioned that when the cone is screwed in place as indicated, the flange closely fits around the ball case and extends inward nearly to the body of the hub. A soft washer K is shown as interposed between the flange and the body of the hub, and a similar washer may be placed between the cone and the end face of the ball case; but practically, there is little need for this latter washer. The sheet steel cone is of approximately the same thickness throughout, although the central tube is somewhat thinner near its end. The cone thus made may be thinner than it is practicable to make a turned cone, and the part in contact with the balls may be hardened with greater certainty and uniformity than with other constructions, and at the same time all the other parts may be left with all the toughness of drawn sheet steel.

In Fig. 3, the axle, cone, washer and ball case, are all like corresponding parts already described, but the hub proper is made up by brazing together the three independently formed parts B, I, J. The edge of the part, or cup, J is, in this form, the part of the hub against which the washer rests.

What I claim is—

1. The combination with the axle, the hub having the projecting ball case, and bearing balls in said case, of the sheet steel cone comprising the central tube, the ball case cover and the case-encircling flange.

2. The combination with the axle and hub having the projecting ball case and bearing balls therein, of the sheet steel cone comprising the central tube, the ball case cover and the case encircling flange, and a washer interposed between said cone and the hub, substantially as set forth.

In testimony whereof I affix my signature in presence of two witnesses.

ALBERT PERKINS.

Witnesses:
HENRY N. LYON,
SIDNEY SANDERS.